United States Patent
Chou et al.

(10) Patent No.: US 9,807,743 B2
(45) Date of Patent: Oct. 31, 2017

(54) NETWORK-ASSISTED LTE CHANNEL ACQUISITION

(71) Applicant: Intel IP Corporation, Santa Clara, CA (US)

(72) Inventors: Joey Chou, Scottsdale, AZ (US); Adrian P. Stephens, Cambridge (GB)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/771,853

(22) PCT Filed: Dec. 24, 2013

(86) PCT No.: PCT/US2013/077666
§ 371 (c)(1),
(2) Date: Sep. 1, 2015

(87) PCT Pub. No.: WO2014/163693
PCT Pub. Date: Oct. 9, 2014

(65) Prior Publication Data
US 2016/0021593 A1    Jan. 21, 2016

Related U.S. Application Data

(60) Provisional application No. 61/808,597, filed on Apr. 4, 2013.

(51) Int. Cl.
*H04J 3/00*    (2006.01)
*H04W 72/04*   (2009.01)
(Continued)

(52) U.S. Cl.
CPC .......... *H04W 72/0413* (2013.01); *H04B 1/38* (2013.01); *H04B 7/024* (2013.01);
(Continued)

(58) Field of Classification Search
CPC ......... H04W 36/30; H04B 1/38; H04B 7/024; H04L 5/0053
See application file for complete search history.

(56) References Cited

U.S. PATENT DOCUMENTS

2008/0159245 A1 * 7/2008 Benn .................. H04L 63/0428
                                                    370/338
2009/0129291 A1 * 5/2009 Gupta .................... H04W 8/26
                                                    370/254

(Continued)

FOREIGN PATENT DOCUMENTS

CN    102164390 A    8/2011
WO    2011020488 A1   2/2011
(Continued)

OTHER PUBLICATIONS

U.S. Appl. No. 61/637,174 Provisional Specification.*
(Continued)

*Primary Examiner* — Siren Wei
(74) *Attorney, Agent, or Firm* — Grossman, Tucker, Perreault & Pfleger, PLLC

(57) ABSTRACT

In one embodiment, the present disclosure provides an IRP manager configured to query at least one eNB to determine physical layer cell identification and/or LTE band information associated with one or more cell coverage areas associated with the at least one eNB and determine an optimal physical layer cell identification and LTE band for at least one cell associated with the at least one eNB. The optimal physical layer cell identification and/or LTE band may be based on, for example, network topology statistics (e.g., current cell coverage area, etc.), traffic load, etc. The optimal physical layer cell identification and/or LTE band information may be utilized by at least one UE within a coverage area of a WLAN AP to provide cell connection in the event (Continued)

the at least one UE falls outside the coverage area of a WLAN AP.

12 Claims, 6 Drawing Sheets

(51) Int. Cl.
| | |
|---|---|
| H04L 5/00 | (2006.01) |
| H04B 7/024 | (2017.01) |
| H04W 24/02 | (2009.01) |
| H04W 74/08 | (2009.01) |
| H04W 36/30 | (2009.01) |
| H04B 1/38 | (2015.01) |
| H04W 76/00 | (2009.01) |
| H04W 76/02 | (2009.01) |
| H04W 24/08 | (2009.01) |
| H04L 12/26 | (2006.01) |
| H04W 4/00 | (2009.01) |
| H04W 68/02 | (2009.01) |
| H04L 12/18 | (2006.01) |
| H04L 29/08 | (2006.01) |
| H04W 8/00 | (2009.01) |
| H04W 56/00 | (2009.01) |
| H04W 72/12 | (2009.01) |
| H04L 5/14 | (2006.01) |
| H04W 36/00 | (2009.01) |
| H04L 1/18 | (2006.01) |
| H04B 7/0456 | (2017.01) |
| H04B 7/06 | (2006.01) |
| H04W 76/04 | (2009.01) |
| H04W 76/06 | (2009.01) |
| H04W 84/12 | (2009.01) |
| H04W 84/04 | (2009.01) |
| H04W 88/02 | (2009.01) |
| H04L 29/06 | (2006.01) |
| H04W 92/20 | (2009.01) |
| H04W 88/08 | (2009.01) |
| H04W 36/38 | (2009.01) |
| H04W 36/14 | (2009.01) |
| H04W 36/36 | (2009.01) |

(52) U.S. Cl.
CPC .......... *H04L 1/1854* (2013.01); *H04L 5/0053* (2013.01); *H04L 5/0055* (2013.01); *H04L 5/0094* (2013.01); *H04L 5/14* (2013.01); *H04L 12/18* (2013.01); *H04L 43/0823* (2013.01); *H04L 65/1016* (2013.01); *H04L 65/4076* (2013.01); *H04L 65/4092* (2013.01); *H04L 67/02* (2013.01); *H04L 67/1076* (2013.01); *H04W 4/005* (2013.01); *H04W 8/005* (2013.01); *H04W 24/02* (2013.01); *H04W 24/08* (2013.01); *H04W 36/0088* (2013.01); *H04W 36/0094* (2013.01); *H04W 36/30* (2013.01); *H04W 56/001* (2013.01); *H04W 68/02* (2013.01); *H04W 72/042* (2013.01); *H04W 72/048* (2013.01); *H04W 72/0446* (2013.01); *H04W 72/0486* (2013.01); *H04W 72/1215* (2013.01); *H04W 72/1263* (2013.01); *H04W 74/0808* (2013.01); *H04W 76/00* (2013.01); *H04W 76/02* (2013.01); *H04W 76/022* (2013.01); *H04W 76/025* (2013.01); *H04W 76/046* (2013.01); *H04W 76/048* (2013.01); *H04W 76/06* (2013.01); *H04B 7/0456* (2013.01); *H04B 7/0639* (2013.01); *H04L 5/0007* (2013.01); *H04L 65/105* (2013.01); *H04L 65/1006* (2013.01); *H04W 36/14* (2013.01); *H04W 36/36* (2013.01); *H04W 36/38* (2013.01); *H04W 76/04* (2013.01); *H04W 76/041* (2013.01); *H04W 76/068* (2013.01); *H04W 84/045* (2013.01); *H04W 84/12* (2013.01); *H04W 88/02* (2013.01); *H04W 88/08* (2013.01); *H04W 92/20* (2013.01)

(56) References Cited

U.S. PATENT DOCUMENTS

| | | | |
|---|---|---|---|
| 2011/0122769 A1* | 5/2011 | Zhang | H04B 3/54 370/235 |
| 2011/0201339 A1 | 8/2011 | Kuningas | |
| 2011/0222523 A1 | 9/2011 | Fu et al. | |
| 2012/0170557 A1* | 7/2012 | Tsfati | H04W 72/1215 370/338 |
| 2013/0064120 A1* | 3/2013 | Bodog | H04W 24/10 370/252 |
| 2013/0281089 A1* | 10/2013 | Chandrasekhar | H04W 24/02 455/434 |
| 2013/0329666 A1* | 12/2013 | Degani | H04W 72/08 370/329 |
| 2014/0254398 A1* | 9/2014 | Li | H04W 28/08 370/252 |

FOREIGN PATENT DOCUMENTS

| | | |
|---|---|---|
| WO | 2012135793 A2 | 10/2012 |
| WO | 2012142436 A1 | 10/2012 |
| WO | 2013-029672 A1 | 3/2013 |

OTHER PUBLICATIONS

U.S. Appl. No. 61/658,485 Provisional Specification.*
International Search Report and Written Opinion received for PCT Application No. PCT/US2013/077666, dated Apr. 25, 2014, 13 pages.
International Preliminary Report on Patentability received for PCT Application No. PCT/US2013/077666, dated Oct. 15, 2015, 5 pages.
Cisco, "Cisco Visual Networking Index: Global Mobile Data Traffic Forecast Update, 2014-2019," dated Feb. 3, 2015, White Paper, 42 pages.
Office Action received for Taiwan Patent Application No. 103,112,287, dated Sep. 21, 2015, 7 pages of English translation and 6 pages of Taiwanese Office Action.
European Extended Search Report issued in European Application No. 13880978.5, dated Jan. 5, 2017, 38 pages.
3rd Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Information Service (IS) (Release 11), 3GPP Standard; 3GPP TS 32.762, France, vol. SA WG5, No. VII.1.0, Mar. 16, 2012, pp. 1-56.

* cited by examiner

| Element ID 602 | Length 604 | LTE Band 606 | Physical Layer Cell ID 608 |

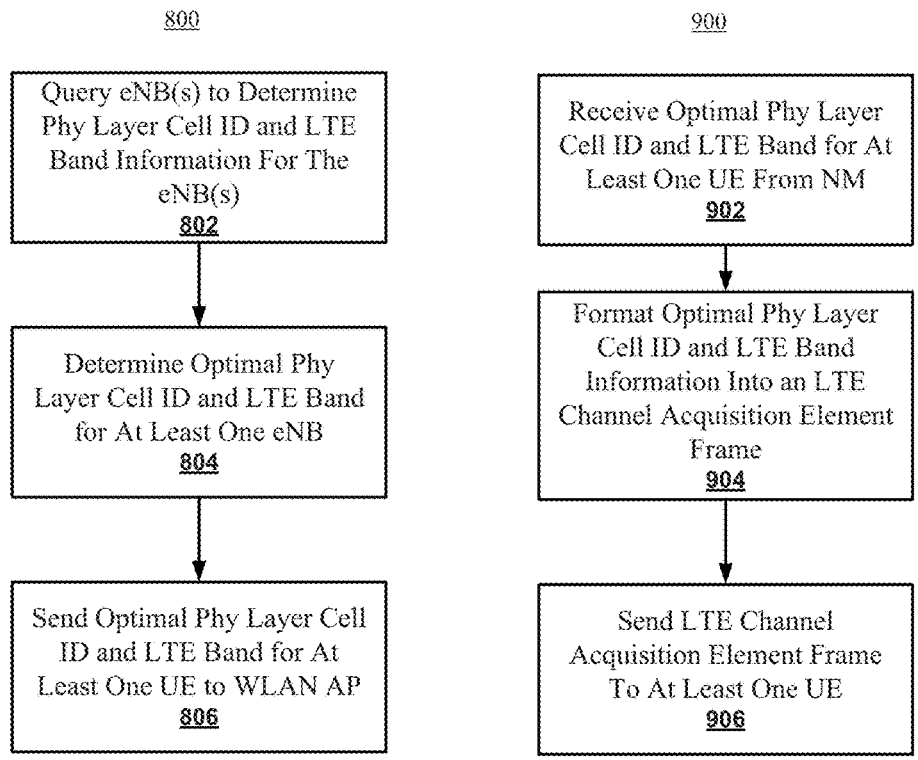
FIG. 8
FIG. 9
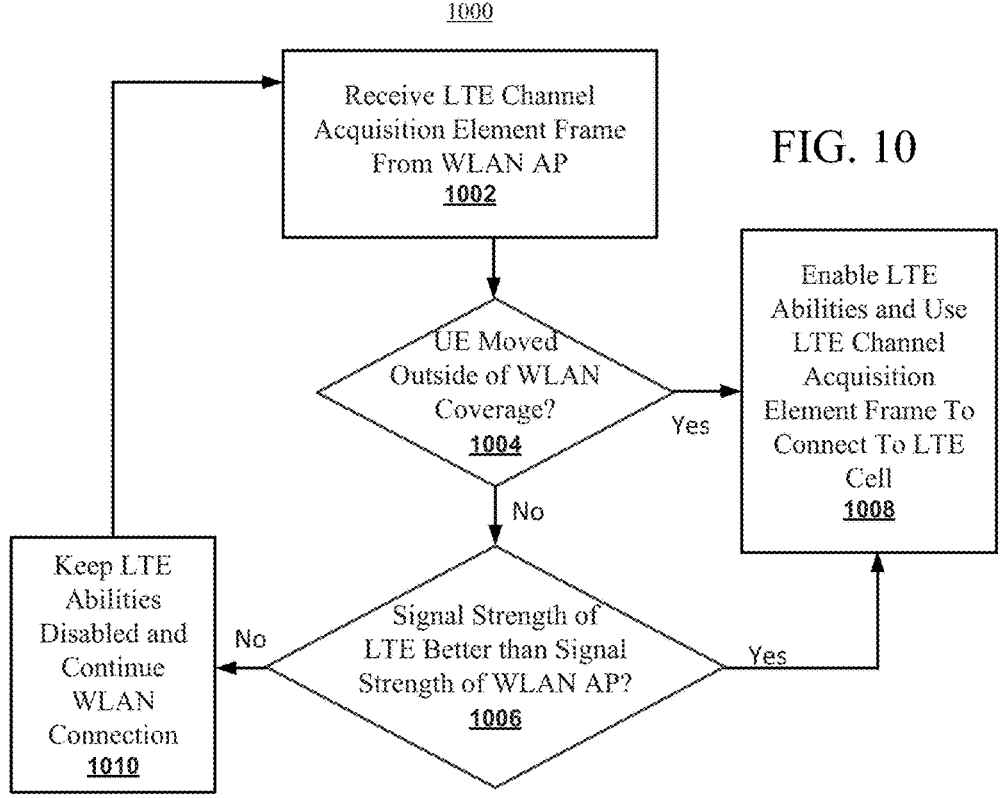
FIG. 10

NETWORK-ASSISTED LTE CHANNEL ACQUISITION

CROSS-REFERENCE TO RELATED APPLICATIONS

The present patent application is related to and claims priority to U.S. Provisional Patent Applications: Ser. No. 61/808,597 filed Apr. 4, 2013, the contents of which are incorporated herein by reference in their entirety.

FIELD

The present disclosure network-assisted LTE channel acquisition for user equipment, and more particularly, network-assisted LTE channel acquisition for Wireless Local Area Network (WLAN)-connected user equipment.

BACKGROUND

Mobile data is projected to grow rapidly at the estimated CAGR of 66 percent from 2012 to 2017. Scaling network capacity through deployments of new base stations or advanced technology upgrades is not a viable option to keep up with the mobile data demand. Since Wi-Fi has become a standard feature on Smartphone, tablets and notebooks, mobile data offloading to Wi-Fi is helping operators to address the data growth that they are facing today. According to a GSMA wireless intelligence report in March 2013, Wi-Fi accounted for almost two-thirds of mobile's wireless data traffic and the operator had 3.83 million Wi-Fi access points in place at year-end. These numbers are beginning to reflect the Wi-Fi trends seen in highly advanced markets such as the US, South Korea and Japan where Wi-Fi offloading is common. Japan's KDDI is targeting half of its mobile data traffic being offloaded onto its Wi-Fi networks by this month, up from 43% at year-end 2012. Meanwhile, AT&T—which operates 32,000 of its own hotspots across the US—recently published statistics showing that connections to its Wi-Fi network more than doubled year-on-year in 2012. As the Smartphone or other mobile devices are increasingly connected to the Internet via Wi-Fi, it becomes less desirable to keep the Smartphone's LTE connection active as this will typically drain the battery quickly, and waste the LTE radio resources. However, if the LTE radio is switched off, it typically takes a long time for this mobile device to be reconnected to the LTE networks.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 8 illustrates a flowchart of operations of an example embodiment consistent with the present disclosure;

FIG. 9 illustrates a flowchart of operations of another example embodiment consistent with the present disclosure; and FIG. 10 illustrates a flowchart of operations of another example embodiment consistent with the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure provides devices, systems and methods for efficient transition from a wireless local area network (WLAN) connection to an LTE/LTE-A network cell connection when a UE moves out of WLAN coverage. In one embodiment, the present disclosure provides an IRP manager configured to query at least one eNB to determine physical layer cell identification and/or LTE band information associated with one or more cell coverage areas associated with the at least one eNB and determine an optimal physical layer cell identification and LTE band for at least one UE associated with the at least one eNB. The optimal physical layer cell identification and/or LTE band may be based on, for example, network topology statistics (e.g., current cell coverage area, etc.), traffic load, etc. The optimal physical layer cell identification and/or LTE band information for at least one UE may be sent to a WLAN access point (AP). In another embodiment, the present disclosure provides a WLAN AP that is configured to receive the optimal physical layer cell identification and/or LTE band information from the IRP manager and format the optimal physical layer cell identification and/or LTE band information into a wireless frame (e.g., 802.11 compatible frame format). The WLAN AP is also configured to periodically broadcast the wireless frame that includes the optimal physical layer cell identification and/or LTE band information to at least one UE within the WLAN AP coverage area. In other embodiments, UE is provided that is configured to receive the wireless frame that includes the optimal physical layer cell identification and/or LTE band information. If the UE moves away from the WLAN AP coverage area, the UE is configured to enable LTE abilities and use the optimal physical layer cell identification and/or LTE band information to efficiently select and synchronize to an LTE/LTE-A network cell.

Figure 1:
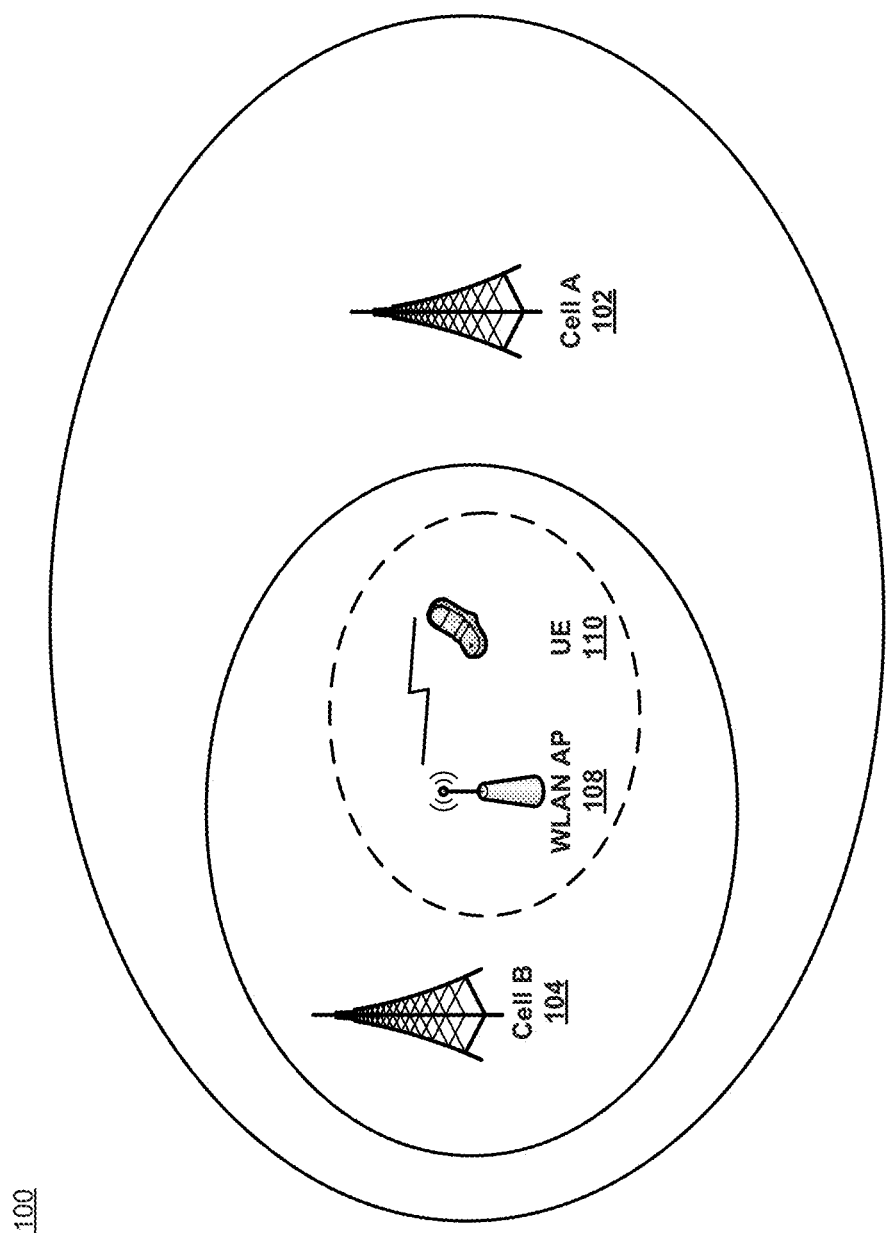
FIG. 1 illustrates a simplified wireless network according to one example embodiment of the present disclosure.

FIG. 1 illustrates a simplified wireless network 100 according to one example embodiment of the present disclosure. The wireless network 100 includes cell A 102 and cell B 104. The coverage area of Cell A 102 is larger than Cell B 104, and overlaps the coverage of cell B 104. The network 100 also includes a WLAN AP 108 that in communication with at least one user equipment (UE) 110. The UE may be any type of mobile device or platform, for example, smartphone, tablet, laptop, ultrabook, etc. The coverage area (dashed line) of the WLAN AP 108 is within the coverage area of cell B 104 (and cell A 102). As the UE 110 moves out of the coverage are of the WLAN AP 106, a determination is made as to the optimal cell connection (between cell A or cell B in this example), as will be described in greater detail below. While this is a simplified example, for illustration purposes, it will be appreciated that in practice any configuration of eNBs, UEs and WLAN APs of various types may be deployed and may provide coverage extending to any number or areas, regions or sectors. The wireless cell network, as used herein, may comply with, or otherwise be compatible with, the Third Generation Partnership Project (3GPP) Long Term Evolution (LTE) and/or LTE-Advanced (LTE-A) based wireless network standard, including current, previous and/or future versions of that standard. The WLAN, as used herein, may comply with, or otherwise be compatible with, the IEEE 802.11 wireless standards (e.g., IEEE 802.11bj, 802.11n, etc.), including current, previous and/or future versions of the standard.

Figure 2:
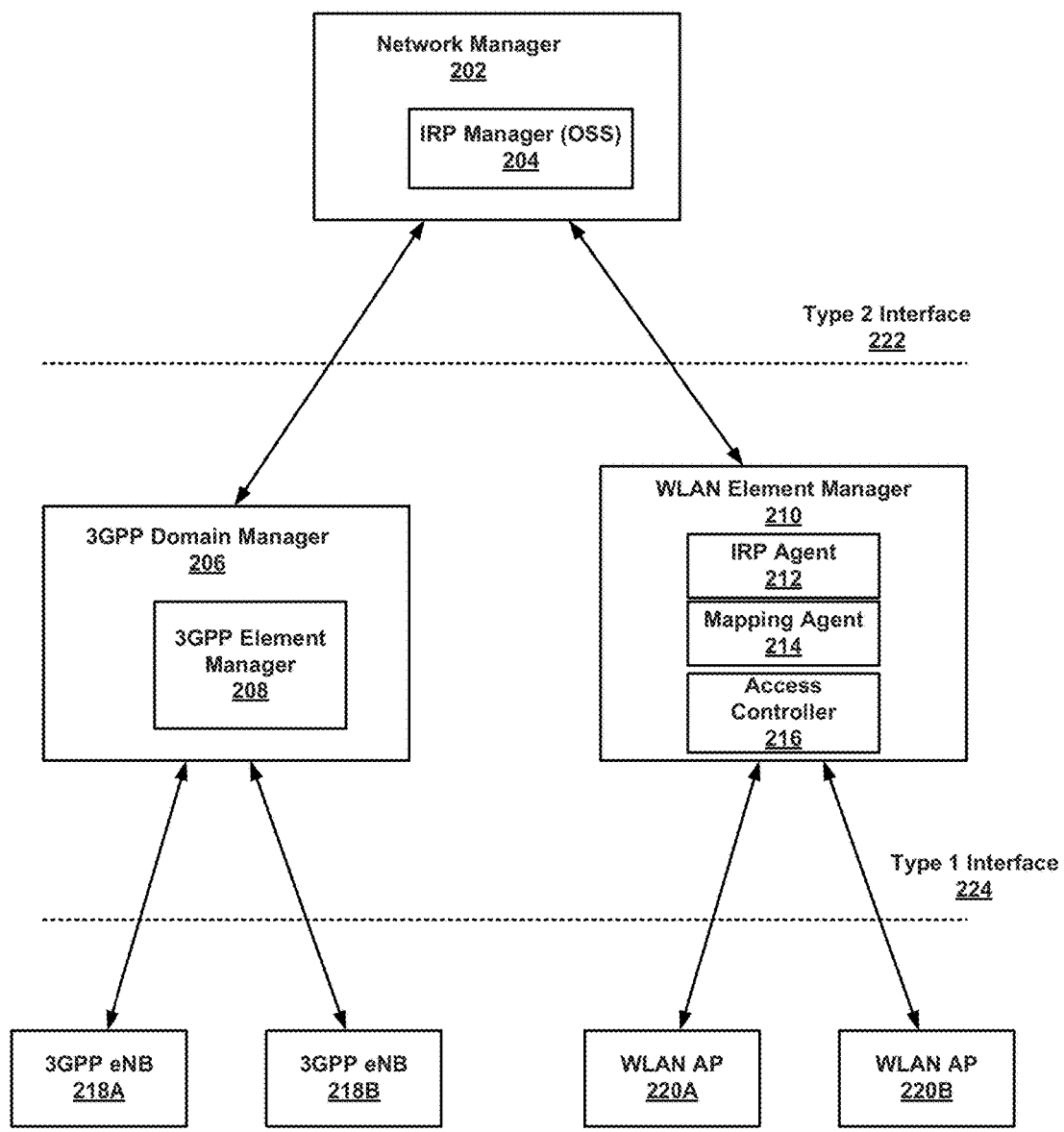
FIG. 2 illustrates an example wireless network system diagram according to various embodiments of the present disclosure.

FIG. 2 illustrates an example wireless network system diagram 200 according to various embodiments of the present disclosure. The wireless network system 200 includes a plurality of hardware devices, hardware platforms and associated signaling, functionality, software and definition which may generally comply with, or otherwise be compatible with, the 3GPP standard. Reference to hardware platforms and/or software modules (e.g., UE, eNodeB, eNB, NB, EM, NM, IRP, AC, etc.) and associated signaling and functionality, as used herein, may be generally defined by the aforementioned 3GPP standards, and/or derivatives thereof.

The network manager (NM) 202 is shown to include an IRP manager 204, also known as an operations support system (OSS). An IRP manager or OSS is typically a computer system and/or software application configured to provide and facilitate network support functions to network operators or providers. These support functions may include configuration, performance monitoring and fault detection, and other operations as will be described in greater detail below. The IRP manager 204 may be configured to communicate with the 3GPP eNBs 218A, . . . , 218B through a 3GPP domain manager 206 which may include a 3GPP element manager 208. 3GPP domain manager 206 may be configured to provide both element and domain management function for a sub-network, while 3GPP element manager 208 may be configured to provide a set of end-user functions for management of a set of related types of network elements, for example 3GPP eNBs 106.

The IRP manager 204 may also be configured to communicate with the WLAN APs 108 through a WLAN element manager 210. WLAN element manager 210 may be configured to provide both element and domain management function for a sub-network, and a set of end-user functions for management of a set of related types of network elements, for example WLAN APs 220A, . . . , 220B. While the IRP manager 204 is illustrated as being associated with the NM 202, in other embodiments, the IRP manager 204 may be associated with other systems, subsystems or components of the network 200, for example, the IRP manager 204 may be deployed with the 3GPP domain manager 206, the 3GPP element manager 208, the WLAN element manager 210, etc.

Each eNB 218A, . . . , 218B is generally configured to provide cell coverage areas (not shown in this Figure). In some embodiments, one or more eNBs may be operable to cover a single cell area, while in other embodiments, at least one eNB may be operable to cover multiple cells or sectors, while in other embodiments, at least one cell may be partitioned so that multiple eNBs cover that cell. While this is a simplified example, for illustration purposes, it will be appreciated that in practice any configuration of eNBs, UEs and WLAN APs of various types may be deployed and may provide coverage extending to any number or areas, regions or sectors. User equipment (UE, not shown in this Figure) may typically be configured to transmit voice and data traffic to and from the eNB 218A, . . . , 218B. NM 202 may be configured to communicate with the eNBs in the network 200, to monitor the PLMN system behavior performance and to ensure increased efficiency and reliability of the system operation, as will be described in greater detail below.

The NM 202, the DM 206 and EM 210 may include interface circuitry to enable communication. In one example, the interface may include a type 2 interface 222. The type 2 interface 222 may be defined by the aforementioned 3GPP standard and/or a user defined (e.g., proprietary) interface protocol. The DM 206, EM 210, eNBs 218A, . . . , 218B, and WLAN Aps 220A, . . . , 220B may also include interface circuitry to enable communication therebetween. In one example, the interface may include a type 1 interface 224. The type 1 interface 224 may be defined by the aforementioned 3GPP standard and/or a user defined (e.g., proprietary) interface protocol. The EM 210 may also be configured to provide message translation between the type 1 interface 224 and the type 2 interface 222. The WLAN EM 210 may include an IRP Agent 212 configured to enable communications between the IRP manager 204 and the WLAN EM 210. The WLAN EM 210 may also include a WLAN access controller 216 configured to enable communications between the EM 210 and the WLAN Aps 220A, . . . , 220B. Mapping agent 214 is configured to map messages between the communications protocol of the WLAN Aps 220A, . . . , 220B and the communications protocol of the IRP manager 204.

Figures 3, 4:
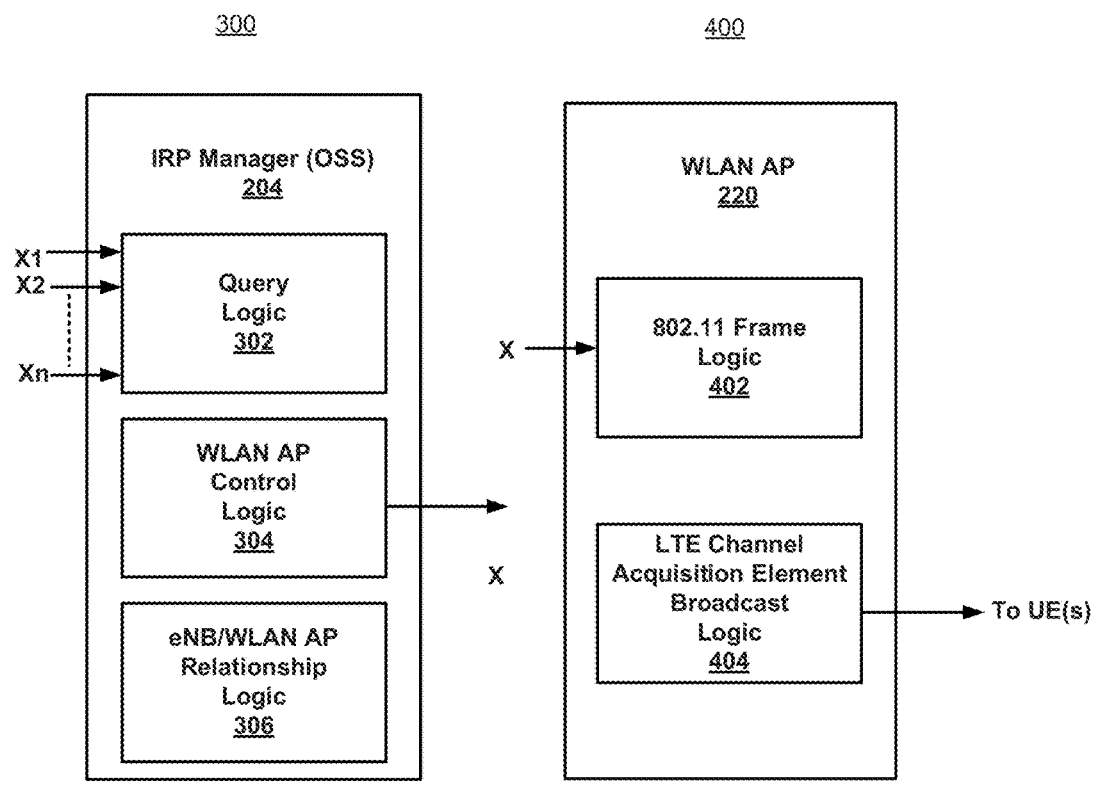
FIG. 3 illustrates a block diagram of an example IRP manager according to one embodiment of the present disclosure.
FIG. 4 illustrates a block diagram of an example WLAN AP according to one embodiment of the present disclosure.

FIG. 3 illustrates a block diagram 300 of an example IRP manager according to one embodiment of the present disclosure. In this example, the IRP manager 204 is generally configured to query at least one eNB to determine physical layer cell identification and/or LTE band information associated with one or more cell coverage areas associated with the at least one eNB and determine an optimal physical layer cell identification and LTE band associated with the at least one eNB. The IRP manager 204 includes query logic 302, WLAN AP control logic 304, and eNB/WLAN AP relationship logic 306. The query logic is configured to query at least one eNB to retrieve physical layer cell identification and/or LTE band information X1, X2, . . . , Xn. The query logic 302 is also configured to determine, from among X1, X2, . . . , Xn, an optimal or "best" physical layer cell identification and/or LTE band for a cell to use in the event a specific UE moves outside of a WLAN AP coverage area. The optimal physical layer cell identification and/or LTE band may be based on, for example, network topology statistics (e.g., current cell coverage area, coverage area of neighboring cells, etc.), traffic load, cell outage or quality of cell service, quality of service (QoS) class associated with a UE/eNB, a user priority class, etc. WLAN AP control logic 304 is configured to generate a control frame that includes optimal physical layer cell identification and/or LTE band information for a specific cell, labelled as X in FIG. 3. The WLAN AP control logic 304 is also configured to transmit X to at least one WLAN AP. The eNB/WLAN AP relationship logic 306 is configured to determine the coverage relationship between at least one eNB and at least one WLAN AP. Referring again to FIG. 1 as an example, the eNB/WLAN AP relationship logic 306 is configured to determine that the WLAN AP 108 is covered by the eNB associated with for Cell B and the eNB associated with Cell A (e.g., the coverage area of Cells A and B cover the coverage area of the WLAN AP 108, at least in part. This information may be used by the query logic 302 to determine the optimal physical layer cell identification and/or LTE band for a cell to use in the event a specific UE moves outside of a WLAN AP coverage area.

FIG. 4 illustrates a block diagram 400 of an example WLAN AP according to one embodiment of the present disclosure. In this example, the WLAN AP WLAN AP 220 is generally configured to is configured to receive the optimal physical layer cell identification and/or LTE band information (X) from the IRP manager and format the optimal physical layer cell identification and/or LTE band information into a wireless frame (e.g., 802.11 compatible frame format). The WLAN AP 220 is also generally configured to periodically broadcast the wireless frame that includes the optimal physical layer cell identification and/or LTE band information to at least one UE within the WLAN AP coverage area. The WLAN AP 220 of this example includes 802.11 frame logic 402 configured to format the physical layer cell identification and/or LTE band information into a compatible from wireless frame format, for example an 802.11-compatible frame format. The WLAN AP 220 also includes LTE channel acquisition element broadcast logic 404 configured to periodically broadcast the wireless frame that includes the physical layer cell identification and/or LTE band information to at least one UE within the coverage area of the WLAN AP 220. The wireless frame that includes the physical layer cell identification is referred to herein as an "LTE channel acquisition element". The term "periodically", as used herein in the context, is generally defined as the frequency at which the LTE channel acquisition element is broadcast to at least one UE by logic 404. The frequency at which the logic 404 broadcasts the LTE channel acquisition element may be based on, for example, user-defined values, network heuristics (e.g., average time that a UE spends within the coverage area of the WLAN AP, historical time periods of specific UEs, etc.), network topology statistics (e.g., current cell coverage area, etc.), changes in WLAN AP coverage and/or cell coverage, traffic load, quality of service (QoS) class associated with a UE/eNB, a user priority class, etc.

Figures 5, 6:
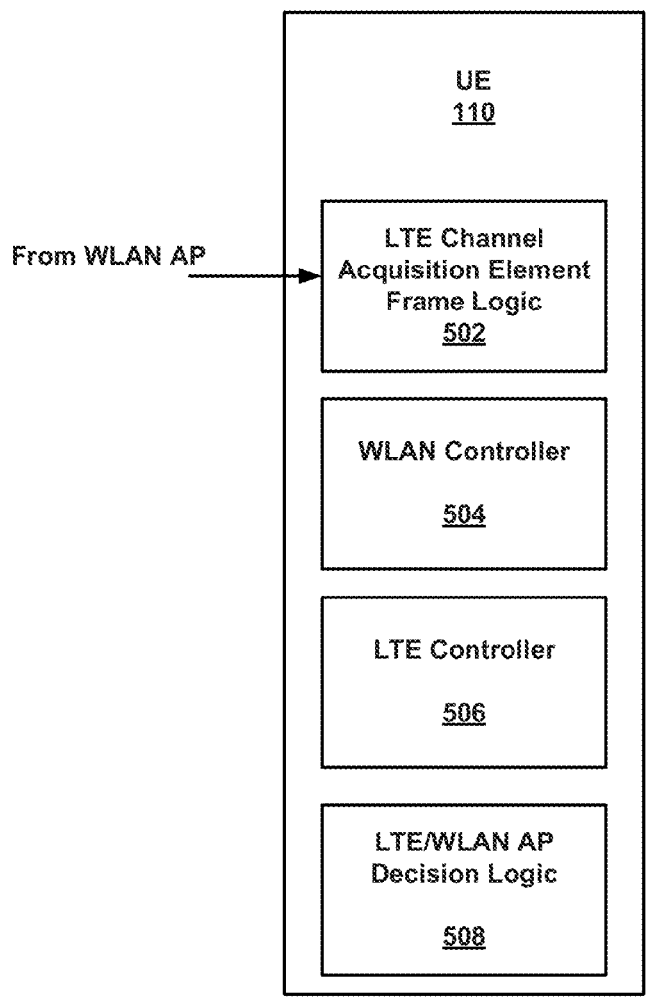
FIG. 5 illustrates a block diagram of an example UE according to one embodiment of the present disclosure.
FIG. 6 illustrates an LTE channel acquisition element frame according to one example embodiment.

FIG. 5 illustrates a block diagram 500 of an example UE according to one embodiment of the present disclosure. In this example, the UE 110 is generally configured to utilize the LTE channel acquisition element to connect to an LTE cell in the event that the UE loses coverage of the WLAN AP (e.g., the UE moves, the WLAN AP losses connectivity, etc.). The UE 110 includes LTE channel acquisition element frame logic 502 configured to parse the LTE channel acquisition element frame received from the WLAN AP to determine physical layer cell identification and/or LTE band information associated with a target cell. The UE 110 also includes a WLAN controller 504 configured to provide WLAN communications with the WLAN AP. The UE 110 also includes an LTE controller configured to provide LTE cell communications with an LTE network. The UE 110 may use the LTE channel acquisition element frame to efficiently connect to an LTE cell if the UE moves outside of the wireless coverage area of the WLAN AP. Here, the term "efficiently" means that the UE may avoid other cell connections procedures such as scanning LTE channels and determining which channels are available, which may be time consuming and/or require excessive power demands. In addition, the LTE channel acquisition element may enable the UE to keep an LTE antenna and associated circuitry in an off or low-power state while within the coverage area of the WLAN AP, thus conserving power of the UE. Referring again to FIG. 1 as an example, if the UE 100 moves outside of the coverage area of the WLAN AP 108, but remains in the coverage area of Cell B 104 and Cell A 102, the LTE channel acquisition element informs the UE which cell to use (Cell A or Cell B) to obtain LTE connectivity. As stated, the IRP manager 204 is configured to determine which cell, among Cell A or Cell B, is the optimum cell for LTE connectivity with the UE.

In some embodiments, the UE 110 may also include LTE/WLAN AP decision logic 508 configured to determine an optimal connection between LTE and WLAN AP. For example, the LTE/WLAN AP decision logic 508 may be configured to scan the LTE channel as indicated by PHY layer cell ID and LTE band information, and may determine which connection, between LTE and WLAN AP is more advantageous in terms of signal strength, throughput, etc. In one example, the LTE/WLAN AP decision logic 508 is configured to compare an RSRP (reference signal received power) and an RSRQ (reference signal received quality) of an LTE channel to an RSRP and RSRQ of the WLAN AP to determine an optimal connection between LTE and WLAN AP.

FIG. 6 illustrates an LTE channel acquisition element frame 600 according to one example embodiment. The LTE channel acquisition element frame 600 is an 802.11 compatible frame that includes a plurality of fields to specify certain information associated with a 3GPP-compatible cell. The LTE channel acquisition element frame 600 includes an element ID field 602 which may be defined by the 802.11 standard. In this example, the element ID field 602 is a one-byte field. The LTE channel acquisition element frame 600 also includes a length field 604 which may also be defined by the 802.11 standard. In this example, the element ID field 604 is a one-byte field. The LTE channel acquisition element frame 600 also includes an LTE band field 606 that may include one or more bits to identify an optimal LTE band (for example, from among 44 LTE bands). The LTE band field 606 includes information related to a frequency and bandwidth associated with an uplink (UL) and downlink (DL) channel for an FDD (Frequency Division Duplex) operational state of the cell, and/or a frequency and bandwidth for a TDD (Time Division Duplex) operational state of the cell. In this example, the LTE band field 606 is a one-byte field. The LTE channel acquisition element frame 600 also includes a physical (PHY) layer cell ID field 608 that may include one or more bits corresponding to one or more unique PHY layer cell identities (e.g., 504 unique PHY layer cell identities, as may be defined by the 3GPP standard). In this example, the physical (PHY) layer cell ID field 608 is a two-byte field. Each PHY layer cell identity corresponds to a specific download reference signal that may be used for slot and frame timing synchronization. LTE signals are transmitted in frames, and each frame typically includes a plurality of slots. The eNB broadcasts the physical layer cell ID that includes the ID of the cell, and the reference signal is utilized by a UE to find the beginning of frame and slot (e.g., downlink signaling synchronization). After the DL link is synchronized, the UE can decode the LTE signals. While the example LTE channel acquisition element frame 600 is specific for 802.11-compliant frames, in other embodiments, other frame types may be used, for example, vendor-specific frame types, proprietary frame types, etc.

Figure 7:
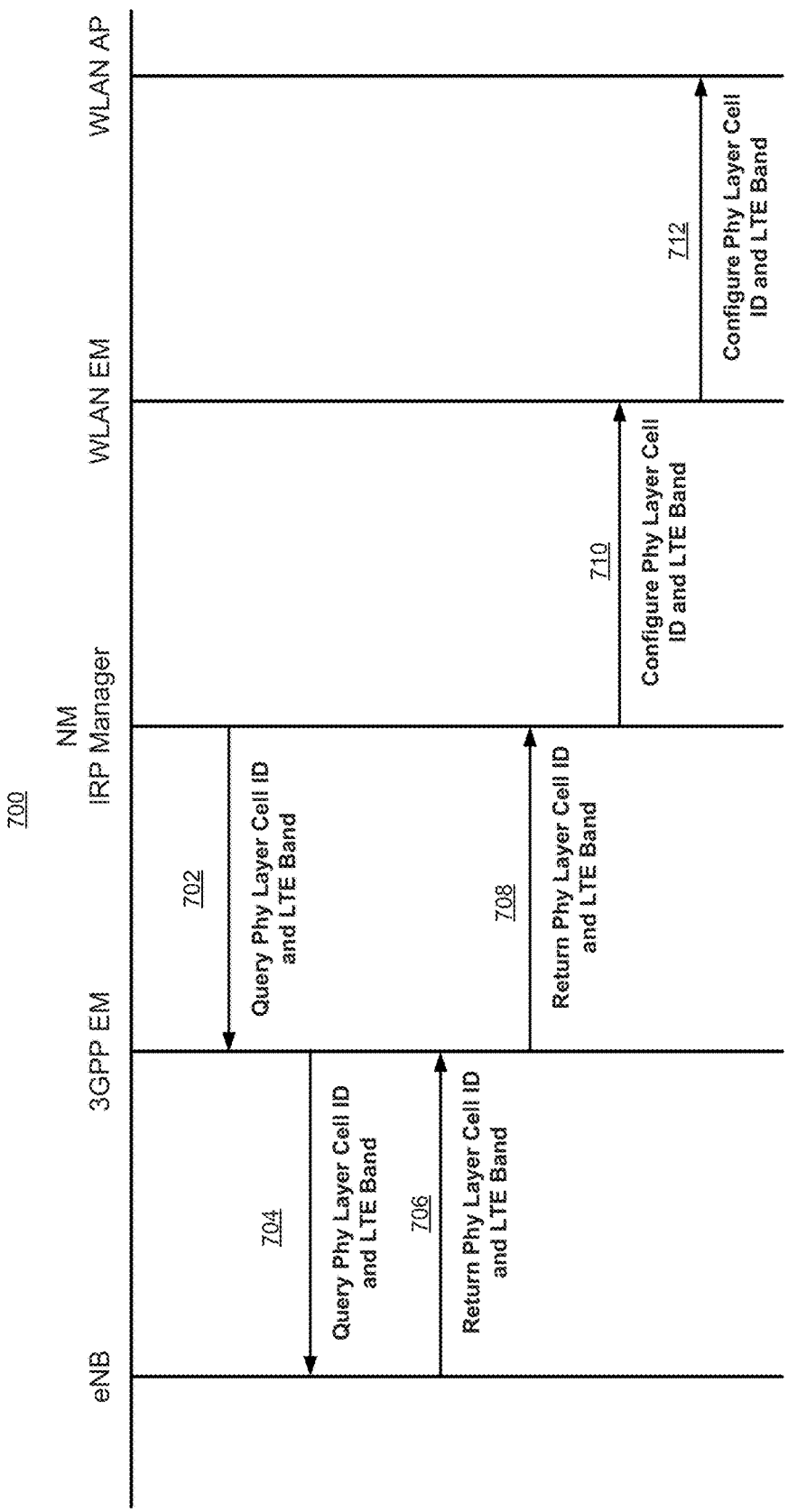
FIG. 7 illustrates reporting operations for physical layer cell ID and LTE band information according to one example embodiment.

FIG. 7 illustrates reporting operations 700 for LTE physical layer and band information according to one example embodiment of the present disclosure. At operation 702, the NM queries the PHY layer cell ID and LTE band information from an eNB, via a 3GPP EM. At operation 704, the 3GPP EM forwards the query from the NM to an eNB. At operation 706, the eNB responds to the query from the NM by returning PHY layer cell ID and LTE band information to the NM, via the 3GPP EM. At operation 708, the 3GPP EM forwards the PHY layer cell ID and LTE band information to the NM. At operation 710, determines an optimum PHY layer cell ID and LTE band associated with at least one eNB and generates a control message for a target WLAN AP to configure the target WLAN AP with the optimum PHY layer cell ID and LTE band information, via the WLAN EM. At operation 712, the WLAN EM forwards the control message to the target WLAN AP. The WLAN EM may also perform any necessary translation/mapping of the control message to translate/map between protocols of the NM and protocols of the WLAN AP.

FIG. 8 illustrates a flowchart 800 of operations of an example embodiment consistent with the present disclosure. In particular, the flowchart 800 illustrates operations of an IRP manager regarding physical layer cell ID and LTE band information. Operations of this embodiments include querying at least one eNB to determine PHY layer cell ID and LTE band information for the at least one eNB 802. Operations also include determining optimal PHY layer cell ID and LTE band for at least one eNB 804. The optimal physical layer cell identification and/or LTE band may be based on, for example, network topology statistics (e.g., current cell coverage area, coverage area of neighboring cells, etc.), traffic load, cell outage or quality of cell service, quality of service (QoS) class associated with a UE/eNB, a user priority class, etc. Operations also include transmitting the optimal PHY layer cell ID and LTE band information to a WLAN AP 806. Selecting an optimal PHY layer cell ID and LTE band information may be based on load balancing among a plurality of eNBs. For example, one or more eNBs may be configured to report periodically their traffic load to the IRP manager. The IRP manager may select the optimal physical layer cell identification and/or LTE band of the eNB for the UE that has the least traffic, in the event that the UE loses WLAN AP coverage.

FIG. 9 illustrates a flowchart 900 of operations of another example embodiment consistent with the present disclosure. In particular, the flowchart 900 illustrates operations of a WLAN AP regarding physical layer cell ID and LTE band information. Operations of this embodiment include receiving optimal PHY layer cell ID and LTE band information from an IRP manager 902. The optimal PHY layer cell ID and LTE band information may be used by at least one UE that is in a coverage area of the WLAN AP. Operations of this embodiment may also include formatting the optimal PHY layer cell ID and LTE band information into an LTE channel acquisition element frame 904. The LTE channel acquisition element frame is a frame format that is compatible with the WLAN AP, for example, an 802.11-compatible frame format. Operations of this embodiment also include periodically sending the LTE channel acquisition element frame to at least one UE within the coverage area of the WLAN AP 906.

FIG. 10 illustrates a flowchart 1000 of operations of another example embodiment consistent with the present disclosure. In particular, the flowchart 1000 illustrates operations of a UE regarding physical layer cell ID and LTE band information. Operations of this embodiment include receiving an LTE channel acquisition element frame from a WLAN AP in communication with the UE 1002. The LTE channel acquisition element frame includes optimal PHY layer cell ID and LTE band information for use by the UE in the event the UE moves outside of the coverage of an associated WLAN AP (e.g., the signal strength of the WLAN AP is lower than certain threshold, or the UE otherwise losses WLAN AP connectivity). Operations also include determining if the UE has moved outside of the WLAN coverage (or if the UE as lost WLAN connectivity) 1004. If the UE has moved outside of the WLAN coverage, operations of this embodiment include enabling the LTE abilities (e.g., LTE antenna and related circuitry) of the UE and using the LTE channel acquisition element frame to connect to an LTE cell 1008. If the UE has not moved outside of the WLAN coverage, operations may also include comparing a signal strength of the LTE channel identified in the LTE channel acquisition element frame and the WLAN AP signal, to determine which signal is better for the UE 1006. If the signal strength of the WLAN AP is greater than the LTE signal strength, operations may also include maintaining the LTE abilities in a disabled state (e.g., off or low power state) and continue with the WLAN connection 1010. If the signal strength of the LTE is greater than the WLAN AP, operations may also include enabling the LTE abilities (e.g., LTE antenna and related circuitry) of the UE and using the LTE channel acquisition element frame to connect to an LTE cell 1008. In some embodiments, for example, a UE may be configured to scan the LTE channel as indicated by PHY layer cell ID and LTE band information, and may switch to LTE if the RSRP (Reference Signal Received Power) and RSRQ (Reference Signal Received Quality) of LTE are better that the RSRP and RSRQ of the WLAN AP.

Embodiments of the operations described herein may be implemented in a system that includes one or more storage devices having stored thereon, individually or in combination, instructions that when executed by one or more processors perform at least one operation. Here, the processor may include, for example, a system CPU (e.g., core processor) and/or programmable circuitry. In some embodiments, the operations described herein may be distributed across a plurality of physical devices, such as processing structures at several different physical locations. Also, it is intended that the method operations may be performed individually or in a subcombination, and thus, not all of the operations of each of the flow charts need to be performed, and the present disclosure expressly intends that all subcombinations of such operations are enabled as would be understood by one of ordinary skill in the art.

The storage medium may include any type of tangible storage device, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A "module", as used in any embodiment herein, may be embodied as circuitry, software, instruction sets, code (e.g., source code, executable code, etc), etc. The circuitry may be embodied as an integrated circuit, such as an integrated circuit chip.

Thus, the present disclosure provides devices, methods, systems and computer-readable storage medium for efficient transition from a wireless local area network (WLAN) connection to an LTE/LTE-A network cell connection when a UE moves out of WLAN coverage. The following examples pertain to further embodiments.

According to one aspect there is provided An IRP manager that includes query logic configured to query at least one eNB in communication with the IRP manager to retrieve physical layer cell identification and/or LTE band information associated with the at least one eNB; the query logic is also configured to determine an optimal physical layer cell identification and/or LTE band information for a cell associated with the at least one eNB; and WLAN AP control logic configured to generate a control frame to control a WLAN AP in communication with the IRP manager, the control frame includes the optimal physical layer cell identification and/or LTE band information for a cell associated with the at least one eNB.

Another example IRP manager includes the forgoing components and further includes an eNB/WLAN AP relationship logic configured to determine the coverage relationship between the at least one eNB and at least one WLAN AP, and further configured to indicate traffic offloading from the at least one eNB to at least one WLAN AP.

Another example IRP manager includes the forgoing components and wherein the optimal physical layer cell identification and/or LTE band is based on at least one of the following parameters: load balancing between a plurality of eNBs, network topology statistics, current cell coverage area, coverage area of one or more neighboring cells, cell network traffic load, cell outage, degraded quality of cell service, quality of service (QoS) class associated with the UE and/or eNB, and/or a user priority class.

Another example IRP manager includes the forgoing components and wherein the optimal physical layer cell identification and/or LTE band information is configured to be utilized by at least one UE within a coverage area of the WLAN AP in the event the at least one UE falls outside the coverage area of the WLAN AP.

Another example IRP manager includes the forgoing components and wherein the query logic and/or the WLAN AP control logic are associated with a network manager (NM) in communication with the at least one eNB.

Another example IRP manager includes the forgoing components and wherein the physical layer cell identification includes informations pertaining to at least one unique physical layer cell identity, and wherein a physical layer cell identity corresponds to a download reference signal that is used for slot and frame timing synchronization with the eNB.

Another example IRP manager includes the forgoing components and wherein the LTE band information includes information pertaining to a frequency and bandwidth associated with an uplink (UL) and downlink (DL) channel for a frequency division multiplex (FDD) operational state of the cell, and/or a frequency and bandwidth for a time division multiplex (TDD) operational state of the cell.

According to another aspect there is provided a method. The method may include querying at least one eNB to retrieve physical layer cell identification and/or LTE band information associated with the at least one eNB; determining an optimal physical layer cell identification and/or LTE band information for a cell associated with the at least one eNB; and generating a control frame to control a WLAN AP, the control frame includes the optimal physical layer cell identification and/or LTE band information for a cell associated with the at least one eNB.

Another example method includes the forgoing operations and wherein the optimal physical layer cell identification and/or LTE band is based on at least one of the following parameters: load balancing between a plurality of eNBs, network topology statistics, current cell coverage area, coverage area of one or more neighboring cells, cell network traffic load, cell outage, degraded quality of cell service, quality of service (QoS) class associated with the UE and/or eNB, and/or a user priority class.

Another example method includes the forgoing operations and wherein the optimal physical layer cell identification and/or LTE band information is configured to be utilized by at least one UE within a coverage area of the WLAN AP in the event the at least one UE falls outside the coverage area of the WLAN AP.

Another example method includes the forgoing operations and wherein the physical layer cell identification includes informations pertaining to at least one unique physical layer cell identity, and wherein a physical layer cell identity corresponds to a download reference signal that is used for slot and frame timing synchronization with the eNB.

Another example method includes the forgoing operations and wherein the LTE band information includes information pertaining to a frequency and bandwidth associated with an uplink (UL) and downlink (DL) channel for a frequency division multiplex (FDD) operational state of the cell, and/or a frequency and bandwidth for a time division multiplex (TDD) operational state of the cell.

According to another aspect there is provided a WLAN AP that includes frame logic configured to format optimum physical layer cell identification and/or LTE band information, received from an IRP manager in communication with the WLAN AP, into a wireless frame format; and LTE channel acquisition element broadcast logic configured to broadcast the wireless frame that includes the physical layer cell identification and/or LTE band information to at least one UE within a coverage area of the WLAN AP.

Another example WLAN AP includes the forgoing components and wherein the optimal physical layer cell identification and/or LTE band information is configured to be utilized by at least one UE within a coverage area of the WLAN AP in the event the at least one UE falls outside the coverage area of the WLAN AP.

Another example WLAN AP includes the forgoing components and wherein the physical layer cell identification includes informations pertaining to at least one unique physical layer cell identity, and wherein a physical layer cell identity corresponds to a download reference signal that is used for slot and frame timing synchronization with the eNB.

Another example WLAN AP includes the forgoing components and wherein the LTE band information includes information pertaining to a frequency and bandwidth associated with an uplink (UL) and downlink (DL) channel for a frequency division multiplex (FDD) operational state of the cell, and/or a frequency and bandwidth for a time division multiplex (TDD) operational state of the cell.

Another example WLAN AP includes the forgoing components and wherein the wireless frame format is an 802.11-compatible frame format.

Another example WLAN AP includes the forgoing components and wherein the LTE channel acquisition element broadcast logic is further configured to periodically broadcast the wireless frame that includes the physical layer cell identification and/or LTE band information to at least one UE within a coverage area of the WLAN AP.

Another aspect provides a method that includes formatting optimum physical layer cell identification and/or LTE band information, received from an IRP manager, into a wireless frame format; and transmitting the wireless frame that includes the physical layer cell identification and/or LTE band information to at least one UE within a coverage area of a WLAN AP.

Another example method includes the forgoing operations and wherein the optimal physical layer cell identification and/or LTE band information is configured to be utilized by at least one UE within a coverage area of the WLAN AP to connect to a cell in the event the at least one UE falls outside the coverage area of the WLAN AP.

Another example method includes the forgoing operations and wherein the physical layer cell identification includes informations pertaining to at least one unique physical layer cell identity, and wherein a physical layer cell identity corresponds to a download reference signal that is used for slot and frame timing synchronization with the eNB.

Another example method includes the forgoing operations and wherein the LTE band information includes information pertaining to a frequency and bandwidth associated with an uplink (UL) and downlink (DL) channel for a frequency division multiplex (FDD) operational state of the cell, and/or a frequency and bandwidth for a time division multiplex (TDD) operational state of the cell.

Another example method includes the forgoing operations and wherein the wireless frame format is an 802.11-compatible frame format.

Another example method includes the forgoing operations and further including periodically transmitting the wireless frame that includes the physical layer cell identification and/or LTE band information to at least one UE within a coverage area of the WLAN AP.

Another aspect provides a UE that includes LTE channel acquisition element frame logic configured to parse an LTE channel acquisition element frame, received from the WLAN AP, to determine physical layer cell identification and/or LTE band information associated with a target cell associated with an eNB; a WLAN controller configured to provide WLAN communications with the WLAN AP; and an LTE controller configured to provide LTE cell communications with an LTE network.

Another example UE includes the foregoing components and wherein the physical layer cell identification and/or LTE band information is configured to be utilized by LTE controller to connect to a cell in the event WLAN controller fails to communicate with the WLAN AP.

Another example UE includes the foregoing components and wherein the LTE controller is configured to be disabled while the WLAN remains in communication with the WLAN AP, and wherein, if WLAN controller fails to communicate with the WLAN AP, the LTE controller is configured to be enabled to permit cell communications using the physical layer cell identification and/or LTE band information.

Another example UE includes the foregoing components and further comprising LTE/WLAN AP decision logic configured to determine an optimal connection between LTE communication and WLAN AP communications by scanning an LTE channel as indicated by PHY layer cell ID and LTE band information and comparing the LTE channel to the WLAN AP channel.

Another example UE includes the foregoing components and wherein the LTE/WLAN AP decision logic is configured to compare an RSRP (reference signal received power) and an RSRQ (reference signal received quality) of an LTE channel to an RSRP and RSRQ of the WLAN AP to determine an optimal connection between LTE and WLAN AP.

Another example UE includes the foregoing components and wherein the physical layer cell identification includes informations pertaining to at least one unique physical layer cell identity, and wherein a physical layer cell identity corresponds to a download reference signal that is used for slot and frame timing synchronization with the eNB.

Another example UE includes the foregoing components and wherein the LTE band information includes information pertaining to a frequency and bandwidth associated with an uplink (UL) and downlink (DL) channel for a frequency division multiplex (FDD) operational state of the cell, and/or a frequency and bandwidth for a time division multiplex (TDD) operational state of the cell.

Another example UE includes the foregoing components and wherein the WLAN controller is configured to provide 802.11-compatible communications with the WLAN AP.

According to another aspect there is provided at least one computer-readable storage medium having instructions stored thereon which when executed by a processor, cause the processor to perform the operations of the method as described in any of the examples above.

According to another aspect there is provided an apparatus including means to perform a method as described in any of the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An integration reference point (IRP) manager, comprising:
   query circuitry configured to query at least one eNodeB (eNB) in communication with the IRP manager to retrieve physical layer cell identification and/or Long Term Evolution (LTE) band information associated with the at least one eNB; the query circuitry is also configured to determine an optimal physical layer cell identification and/or LTE band information for a cell associated with the at least one eNB; and
   wireless local area network (WLAN) access point (AP) control circuitry configured to generate a control frame to control a WLAN AP in communication with the IRP manager to cause the WLAN AP to transmit a wireless frame based on the control frame to user equipment (UE) within communication range of the cell, the wireless frame includes the optimal physical layer cell identification and/or LTE band information for the cell associated with the at least one eNB to allow the UE to changeover wireless communication from the WLAN AP to the cell without having to scan for available LTE channels.

2. The IRP manager of claim 1, further comprising eNB/WLAN AP relationship circuitry configured to determine the coverage relationship between the at least one eNB and at least one WLAN AP, and further configured to indicate traffic offloading from the at least one eNB to at least one WLAN AP.

3. The IRP manager of claim 1, wherein the optimal physical layer cell identification and/or LTE band is based on at least one of the following parameters: load balancing between a plurality of eNBs, network topology statistics, current cell coverage area, coverage area of one or more neighboring cells, cell network traffic load, cell outage, degraded quality of cell service, quality of service (QoS) class associated with the UE and/or eNB, and/or a user priority class.

4. The IRP manager of claim 1, wherein the optimal physical layer cell identification and/or LTE band information is configured to be utilized by at least one UE within a coverage area of the WLAN AP in the event the at least one UE falls outside the coverage area of the WLAN AP.

5. The IRP manager of claim 1, wherein the query circuitry and/or the WLAN AP control circuitry are associated with a network manager (NM) in communication with the at least one eNB.

6. The IRP manager of claim 1, wherein the physical layer cell identification for the cell associated with the at least one eNB includes information pertaining to at least one unique physical layer cell identity, and wherein a physical layer cell identity corresponds to a download reference signal that is used for slot and frame timing synchronization with the eNB.

7. The IRP manager of claim 1, wherein the LTE band information for the cell associated with the at least one eNB includes information pertaining to a frequency and bandwidth associated with an uplink (UL) and downlink (DL) channel for a frequency division multiplex (FDD) operational state of the cell, and/or a frequency and bandwidth for a time division multiplex (TDD) operational state of the cell.

8. A method, comprising:
querying at least one eNodeB (eNB) to retrieve physical layer cell identification and/or Long Term Evolution (LTE) band information associated with the at least one eNB;
determining an optimal physical layer cell identification and/or LTE band information for a cell associated with the at least one eNB; and
generating a control frame to control a wireless local area network (WLAN) access point (AP) to cause the WLAN AP to transmit a wireless frame based on the control frame to user equipment (UE) within communication range of the cell, the wireless frame includes the optimal physical layer cell identification and/or LTE band information for a cell associated with the at least one eNB to allow the UE to changeover wireless communication from the WLAN AP to the cell without having to scan for available LTE channels.

9. The method of claim 8, wherein the optimal physical layer cell identification and/or LTE band is based on at least one of the following parameters: load balancing between a plurality of eNBs, network topology statistics, current cell coverage area, coverage area of one or more neighboring cells, cell network traffic load, cell outage, degraded quality of cell service, quality of service (QoS) class associated with the UE and/or eNB, and/or a user priority class.

10. The method of claim 8, wherein the optimal physical layer cell identification and/or LTE band information is configured to be utilized by at least one UE within a coverage area of the WLAN AP in the event the at least one UE falls outside the coverage area of the WLAN AP.

11. The method of claim 8, wherein the physical layer cell identification for the cell associated with the at least one eNB includes information pertaining to at least one unique physical layer cell identity, and wherein a physical layer cell identity corresponds to a download reference signal that is used for slot and frame timing synchronization with the eNB.

12. The method of claim 8, wherein the LTE band information for the cell associated with the at least one eNB includes information pertaining to a frequency and bandwidth associated with an uplink (UL) and downlink (DL) channel for a frequency division multiplex (FDD) operational state of the cell, and/or a frequency and bandwidth for a time division multiplex (TDD) operational state of the cell.

* * * * *